Dec. 30, 1969 W. L. DEEG 3,487,364

DIGITAL COMPARATOR UTILIZING MAGNETIC LOGIC

Filed Feb. 1, 1966

INVENTOR
WYMAN L. DEEG
by
Mason, Kolehmainen, Rathburn and Wyss
ATTORNEYS

United States Patent Office 3,487,364

Patented Dec. 30, 1969

3,487,364

DIGITAL COMPARATOR UTILIZING MAGNETIC LOGIC

Wyman L. Deeg, Glenview, Ill., assignor to C. P. Clare & Company, Chicago, Ill., a corporation of Delaware Filed Feb. 1, 1966, Ser. No. 523,983
Int. Cl. G06f 7/02
U.S. Cl. 340—146.2 6 Claims

ABSTRACT OF THE DISCLOSURE

The application discloses a digital comparator module and circuit. The module includes a pair of magnetic reed switches operated by a pair of differential windings producing oppositely poled and equal fields. One reed switch is biased closed by a permanent magnet of the same polarity as the field produced by one of the windings. In a plural digit comparator circuit using one module for each digit or bit, the normally closed contacts of the modules are connected in series to an indicator, and the normally open contacts in each module are connected between the closed contacts and the input terminal to one of the windings in the module. Input signals representing equivalent bits of two digits or numbers to be compared are applied to the two winding input terminals.

Figures 1, 2:
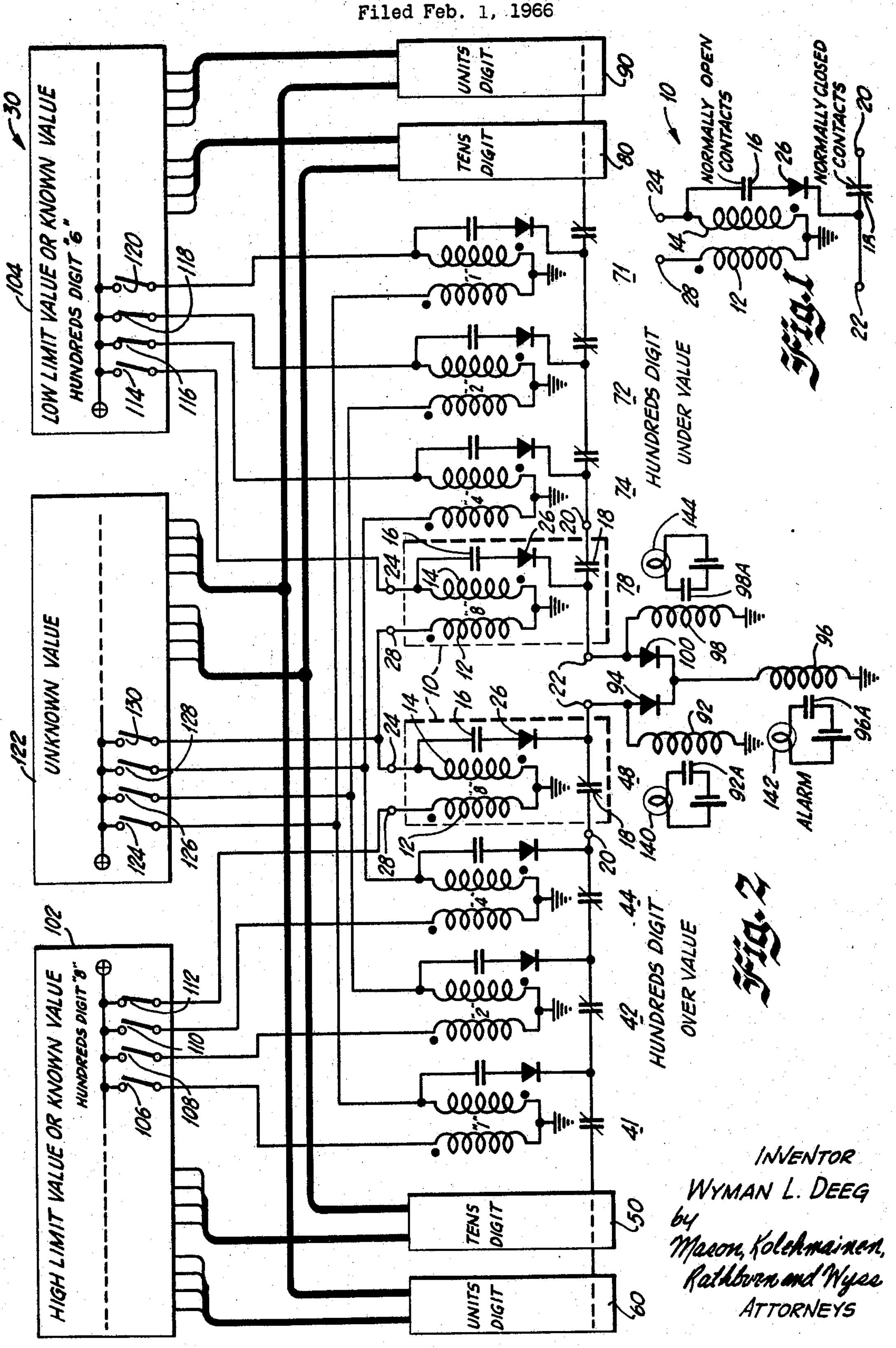

This invention relates to a digital comparator using a binary half subtractor module and, more particularly, to a digital comparator system and half subtractor module using magnetic flux logic.

Many different types of data handling systems requires units capable of determining whether a number or value is less than or greater than another number or value or whether a number or value falls within a range set by limiting values. As an example, supervisory of process control systems in which the values of unknowns are continuously or periodically monitored frequently must enter an alarm or initiate a programmed operation when a monitored value falls outside of a range of values defined by a high limit value and a low limit value. There are, at present, a number of different ways of comparing values in digital form using controlled conduction devices, such as solid state devices or vacuum tubes. These arrangements are frequently excessively costly for many applications and not usable in some adverse operating environments. Further, these prior systems frequently cannot be maintained or serviced by personnel lacking substantial technical competence. In addition, many of the existing systems require excessive buffering against line or ambient transients with the consequent increase in the cost of the digital comparator.

Accordingly, one object of the present invention is to provide a new and improved digital comparator.

A further object is to provide a digital comparator using magnetic logic.

A further object is to provide a digital comparator using a binary half subtractor formed by a bifilar winding and a pair of sealed magnetic switches.

A further object is to provide a binary half subtractor using a pair of sealed magnetic switches, one of which is polarity responsive, and a pair of windings providing oppositely poled magnetic fields of comparable value.

In accordance with these and many other objects, an embodiment of the invention comprises a digital comparator using as a modular element a binary half subtractor module formed of a pair of sealed magnetic switches, a diode, a bifilar winding, and a bias magnet for normally holding one of the magnetic switches in a closed condition and for rendering this closed switch polarity responsive. The two windings provide oppositely poled magnetic fields of comparable strength, and an input terminal to one of the windings is connected to a common output terminal through the diode and the normally open switch. The normally closed switch provides means for coupling the output of the module to the output of another module. By selectively supplying the input terminals of the two windings in the bifilar coil with signals representing the binary "1's" and "0's" of the known and unknown values, the half subtractor module provides output signals representing the equality or lack of equality of the input signals.

As an example, if the binary module is to be used to determine whether a value is greater than a known value, the signal representing the unknown value is connected to the input terminal of the coil providing a field of the same polarity as the bias magnet, and the known value is connected to the terminal of the other coil. If the known and unknown value are the same, i.e., both a "1" or "0," the status of the sealed switches is not altered, a borrow output is not provided from the module, and the module remains in a condition to transmit a borrow from a less significant digit through the normally closed switch in the module. If the unknown value is less than the known value, i.e., the unknown value is a "0" and the known value is a "1," the normally closed switch is opened, and the normally open switch is closed to couple the output terminal to the unknown input terminal through the diode. However, the unknown value "0" is represented by an absence of signals, and the module does not provide a borrow output. On the other hand, if the known value is "0," and the unknown value is "1," the normally open switch is again closed to couple the unknown input terminal to the output terminal through the diode. Since the binary "1" at the unknown input terminal is represented by the presence of a signal, this signal is now transferred to the output to provide a borrow output and an indication that the value of the unknown exceeded the known value. In a similar manner, the binary half subtractor module can be used to detect the fact that the unknown has a value less than a known value by reversing the connections of the signals representing the known and unknown values to the input terminals of the bifilar coil.

Many other objects and advantages of the present invention will become apparent from considering the following detailed description in conjunction with the drawings in which:

FIG. 1 is a schematic diagram of a binary half subtractor module useful in a digital comparator; and FIG. 2 is a schematic circuit diagram of a digital comparator using the half subtractor module shown in FIG. 1.

Referring now more specifically to FIG. 1 of the drawings, therein is illustrated a binary half subtractor module 10 including a bifilar coil including a pair of windings 12 and 14 providing oppositely poled fields of substantially the same value. A pair of sealed magnetic reed switches of known construction are subjected to the influence of the fields produced by the coils 12 and 14 and are represented in FIG. 1 of the drawings as two pairs of contacts 16 and 18. The contacts or switch 16 is normally open, and the contacts or switch 18 is normally biased to a closed condition by a biasing magnet providing a field of the same polarity as the winding 14. The normally closed contacts 18 are connected in series between a borrow input terminal 20 and a borrow output terminal 22 while the contacts 16 are connected in series between an input terminal 24 for the winding 14 and the borrow output terminal 22 through a diode 26 which is of the polarity shown when a positive potential is used to represent the presence of a binary bit or "1" and an open circuit or ground is used to represent the absence of a binary bit or "0." The other winding 12 in the bifilar coil is provided with an input terminal 28.

In a typical digital comparator using the modules 10, a single module 10 is provided for comparing each binary weight in a binary or binary coded decimal value. When the module 10 is used to determine whether an unknown value is greater than a known value, the terminal 28 is connected to the source of signals representing the known value, and the terminal 24 is connected to a source of signals representing the unknown value. The terminal 20 is connected to the output terminal of a module 10 representing the less significant digit, and the output terminal 22 is connected to either an output terminal or the input terminal of a module 10 for comparing a more significant digit. With the illustrated polarity of the diode 26, a binary "1" is represented by a more positive potential, and a binary "0" is represented by an open circuit condition or a near ground potential.

Assuming that the unknown and known values are the same, either both "0's" or both "1's," the windings 12 and 14 produce a zero resultant field due to the failure to energize either of the windings 12 or 14 or the energization of both of the windings 12 and 14. This means that the normally open contacts 16 remain in an open condition, and any input signal supplied to the unknown input terminal 24 cannot be supplied through the diode 26 to the output terminal 22. Since the contacts 18 remain closed because the net field resulting from the signals applied to the input terminals 24 and 28 is negligible, a borrow signal from the less significant module 10 coupled to the terminal 20 is passed through the closed contacts 18 to the output terminal 22.

If the unknown value is less than the known value, i.e., an open circuit supplied to the terminal 24 and a positive signal supplied to the terminal 28, only the winding 12 is energized. The field produced by the energization of the winding 12 closes the contacts 16 and opens the contacts 18 by nullifying the biasing field applied to the contacts 18 by the biasing magnet. This disconnects the input terminal 20 from the output terminal 22 and prevents a carry from a less significant digit through the module 10. The contacts 16 are closed, but since a binary "0" is applied to the input terminal 24, the output terminal 22 does not receive an output signal.

Assuming, however, that the unknown value is greater than the known value, an open circuit is connected to the terminal 28, and a more positive signal is connected to the terminal 24. This energizes the winding 14 to produce a field for closing the normally open contacts 16. Since the field produced by the winding 14 aids the field of the bias magnet, the contacts 18 remain closed. Since the contacts 16 are now closed, the positive signal supplied to the input terminal 24 is coupled through the diode 26 to the output terminal 22 to provide a borrow output indicating that the unknown value is greater than the known value. Since the module 10 provides a signal at the output terminal 22, the fact that the contacts 18 remain closed to couple this module to a module for comparing a less significant digit is of no consequence.

In those applications in which the module 10 is used to determine whether an unknown value is less than a known value and again assuming that a "1" is represented by a more positive potential and a "0" by ground or a near ground potential, the signals representing the unknown value are coupled to the terminal 28, and the signals representing the known value are coupled to the terminal 24. In this application, if the known and unknown values are the same, i.e., both are either "0's" or "1's," the net effective field produced by energizing the windings 12 and 14 is negligible, and the contacts 16 and 18 remain in their normal states so that a borrow signal is not produced by the module 10, but the module remains in a condition to transmit a borrow signal from the comparison of a less significant digit.

If the unknown value is greater than the known value, the terminal 24 is connected to an open circuit, and a more positive signal is applied to the terminal 28. This signal energizes the winding 12 to close the contacts 16 and to open the contacts 18 by producing a field in opposition to the field normally holding the contacts 18 in a closed condition. However, since an open circuit is connected to the terminal 24, the closure of the contacts 16 does not result in the application of a borrow output signal to the output terminal 22. On the other hand, if the unknown value is less than the known value, an open circuit is connected to the terminal 28, and the more positive signal connected to the input terminal 24 energizes the winding 14 to close the contacts 16, which are not polarity responsive, and to maintain the contacts 18 in a closed condition. The more positive signal supplied to the terminal 24 is now transmitted through the closed contacts 16 and the diode 26 to the output terminal 22. This provides a borrow output representing the fact that the unknown value is less than the known value.

FIG. 2 of the drawings illustrates a digital comparator 30 for determining whether a three digit decimal value falls within a range between a high limit value and a low limit value, exceeds the high limit value, or is less than the low limit value. The three digit decimal limit of known values and the unknown values are expressed in binary coded form using binary weights "1," "2," "4," and "8." Thus, twelve modules 10 are used for the high limit evaluation, and twelve modules 10 are used for the low limit evaluation for a total of only twenty-four bifilar windings and forty-eight sealed magnetic switches to provide a high and low limit evaluation of a three digit decimal number.

The system also requires only a single low voltage potential source with a nominal low voltage source of, for instance, twenty-four volts with a five percent regulation.

Accordingly, in FIG. 2 of the drawings, four modules 41, 42, 44, and 48, each identical to the module 10, are provided for comparing the "1," "2," "4," and "8" bits of the hundreds digit of the unknown value against the high limit value, and four identical modules 10 are provided in each of two comparator circuits 50 and 60 for comparing the tens and units digits, respectively, of the unknown value against the corresponding digits and bits of the high limit value. Further, four modules 71, 72, 74, and 78, each identical to the module 10, are provided for comparing the "1," "2," "4," and "8" bits of the hundreds digit of the unknown value with the low limit value. Four identical modules 10 are provided in each of two comparator circuits 80 and 90 in which are compared, respectively, the bits of the tens and units digits of the unknown and low limit values. The twelve modules for comparing the bits of the three decimal digits of the high limit value with the unknown value are connected in series with the output terminal 22 of the least significant bit in the least significant digit connected to the input terminal 20 of the next significant bit proceeding digit by digit. In other words, the output terminal 22 of the "8" bit module 10 in the tens digit comparison circuit 50 is connected to the input terminal 20 of the module 41 for comparing the "1" bit of the hundreds digit. The output terminal 22 of the most significant bit "8" in the module 48 for the most significant hundreds digit is connected directly to a winding 92 of a relay for indicating a high limit violation, and through a decoupling diode 94 to the winding of an alarm relay 96 which provides an indication of either a high or low limit violation. Similarly, in the circuits for checking the unknown value against a low limit, the output terminal 22 of a modulue 10 for comparing a less significant bit is connected to the input terminal 20 of the module 10 for comparing the next most significant bit, proceeding in an ascending digital order. In other words, the output terminal 22 from the modulue 10 for evaulating the "8" bit of the tens digit in the circuit 80 is connected to the input terminal 20 for the module 71 in which the comparison of the "1" bit of the hundreds digit is made. The output terminal 22 from the highest digit, highest bit comparator 78 is directly connected to the winding of a relay 98 for providing an indication of a low limit violation and through a diode 100 to the winding of the alarm relay 96.

The signals providing the high limit values and the low limit values can be provided by any suitable means such as switches, pin connectors, patch panels, or controlled conduction devices. In FIG. 2 of the drawings, a high limit signal source 102 and a low limit signal source 104 are shown in simplified form as comprising groups of switches for connecting the related terminals of the modules to a source of positive potential. As an example, the high limit signal source 102 is shown as including four switches 106, 108, 110, and 112 representing the binary bits "1," "2," "4," and "8" of the value of the hundreds digit of the high limit value. Assuming that the value of the high limit hundreds digit is "8," the switches 106, 108, and 110 are opened, and the switch 112 is closed to continuously energize the winding 12 in the module 48. Similar means are provided for selectively supplying positive potentials to the windings 12 in the units and tens digital comparators 60 and 50, respectively, in accordance with the binary coded value of the units and tens digits of the high limit value. Although the switches may be continuously closed to continuously energize the related windings in the half subtractor modules, the signal source 102 can comprise any of the many circuits of known constructions for synchronizing the supply of these signals with the application of signals representing the unknown value. The source 102 can also supply successive different limit values.

Similarly, the low limit signal source 104 is shown as including four switches 114, 116, 118, and 120 representing the binary weights "8," "4," "2," and "1" of the hundreds digit of the low limit value. If the value of the hundreds digit of the low limit is assumed to be "6," the switches 114 and 120 are opened, and the switches 116 and 118 are closed to energize the windings 14 in the modules 74 and 72 to provide a binary coded designation of the value of the hundreds digit "6." Similar means are provided in the signal source 104 for supplying signals to the related modules in the tens and units digital comparators 80 and 90.

A signal source 122 provides signals representing the unknown value to be compared against the high limit values and the low limit values. Although the signal source 122 can comprise any known suitable source of signals such as an analog-to-digital converter including controlled conduction devices, this signal source is shown in simplified form as including a group of switches for selectively supplying positive potentials to the half subtractor modules representing "1's" in the binary coded values of the decimal digit comprising the unknown value. As an example, the signal source 122 includes four switches 124, 126, 128, and 130 representing the binary weights "1," "2," "4," and "8," respectively, of the hundreds digit of the unknown value. Similar switching means can be provided for supplying binary coded signals to the comparator circuits 50, 60, 80, and 90. In addition, and although the signal sources 102, 104, and 122 are shown as supplying signals representing a single high limit value, a single low limit value, and a single unknown value, in many or most applications these signal sources will include commutating or scanning means synchronized with each other for providing a series of unknown values to the comparator circuit in synchronism with corresponding sets of high and low limit values so that a single comparator circuit 30 can be used with a variety of points or values to be monitored.

As an illustration of the operation of the comparator system, when the unknown value falls within the range between the high limit value "8—" and a low limit value of "6—," it is assumed that the unknown value has a hundreds digit value of "7," and the switches 124,, 126 and 128 are closed to energize the windings 14 in the modules 41, 42, and 44 and the windings 12 in the modules 71, 72, and 74. The closed switch 112 in the signal source 102 continuously energizes the winding 12 in the module 48, and the closed switches 116 and 118 continuously energize the windings 14 in the modules 72 and 74.

With regard to the high limit comparison, the value of the unknown in the modules 41, 42 and 44 is greater than the known value, i.e., the unknown value includes the bit "1," "2," and "4" whereas the high limit value does not include these bits. A positive signal is forwarded to the normally closed contacts 18 in the module 48. However, since the winding 12 in this module is energized representing the presence of the bit "8" in the hundreds digit of the high limit value and the winding 14 in this module is not energized, the contacts 18 are opened, and the contacts 16 are closed. The opening of the contacts 18 in the module 48 prevents the transmission of a positive signal in the modules 41, 42 and 44 to the output terminal 22 of the module 48. Since an open circuit is connected to the input terminal 24 of the module 48, the closure of the contacts 16 does not result in the application of a positive signal to the winding of either of the relays 92 and 96, and an alarm or high limit violation is not provided. Further, since the contacts 18 in the module 48 are opened, any lack of identity occurring in the less significant digits determined in the circuits 50 and 60 cannot result in the energization of the windings 92 and 96. This provides a positive indication that the unknown value is less than the high limit value, i.e., the unknown hundreds digit "7" is less than the high limit digit "8."

Referring now to the low limit comparison, the closed switch 124 in the unknown value source representing the binary "1" in the hundreds digit energizes the winding 12 in the module 71 so that the contacts 18 in this module are opened to prevent the transfer of a borrow signal from the tens digit and units digit comparison circuits 80 and 90. This signal also closes the contacts 16 in the module 71. The does not result in a borrow output signal because an open circuit is connected to the terminal 24 in this module. In the modules 72 and 74, both of the windings 12 and 14 are energized representing identity between the "2" and "4" bits in the coded designation of the unknown hundreds digit "7" and the low limit digit "6." Since neither of the windings 12 and 14 in the module 78 are energized, the three normally closed contacts 18 in the modules 72, 74, and 78 remain closed, but the contacts 16 in these three modules also remain open so that a borrow output signal cannot be provided. Thus, the interruption in the borrow bus provided by the open contacts 18 in the module 71 indicates that the value of the hundreds digit "7" is greater than the value of the low limit hundred digit "6," and a violation signal may not be supplied by either the less significant digit comparator circuits 80 and 90 or the four modules 71, 72, 74, and 78 for comparing the value of the hundreds digit. Thus, the failure to operate any of the relays 92, 96, and 98 indicates that the unknown value fell in the range between the high limit value and the low limit value.

To illustrate the operation of the comparator system 30 when the unknown value exceeds the high limit, it is assumed that the value of the hundreds digit of the unknown value is "9" which is represented by the closure of the switches 124 and 130 to energize the windings 14 in the modules 41 and 48 and the windings 12 in the modules 71 and 78. With regard to the low limit comparison, energization of the winding 12 in the module 78 closes the contacts 16 and opens the contacts 18 therein. Since the terminal 24 in the module 78 is connected to an open circuit, the closure of the contacts 16 cannot provide a borrow signal, and the opening of the contacts 18 prevents a borrow signal generated by the comparison of lower value bits or lower value digits from providing an operating signal to either of the detecting relays 96 or 98.

With regard to the high limit comparison, the energization of the winding 14 in the modules 41 by the closed switch 124 closes the contacts 16 therein and holds the contacts 18 therein closed. The closure of the contacts 16 in the module 41 forwards the positive potential provided by the closed switch 124 through the diode 26 in the module 41 and the closed contacts 18 in the modules 42 and 44 to the input terminal 20 to the module 48. In the module 48, both of the windings 12 and 14 are energized so that a negligible effective field is applied to the switches 16 and 18 therein. Thus, the switch or contact 18 in the module 48 remains closed and forwards positive potential supplied from the module 41 to the winding of the relay 92 to operate this relay to close a pair of normally open contacts 92A. This causes the illumination of a lamp 140 to provide a visible indication that the high limit has been exceeded. The positive potential from the module 41 is also forwarded through the diode 94 to energize the winding of the relay 96 so that a pair of normally open contacts 96A are closed to energize a lamp 142 which provides a visible indication of the alarm condition. If desired, the relays 92, 96, and 98 can be latching and require manual restoration to clear the alarm indication so as to prevent release of these relays and the removal of the alarm indication when the signal representing the unknown value disappears.

To illustrate the operation of the digital comparator 30 when a low limit violation occurs, it is assumed that the hundreds digit of the unknown value has a value "5" which is represented by the closed switches 124 and 128 representing the binary weights "1" and "4," respectively. The closure of the contacts 124 energizes the winding 14 in the module 41 and the winding 12 in the module 71, whereas the closure of the switch 128 energizes the winding 14 in the module 44 and the winding 12 in the module 74. With reference to the high limit comparison, the energization of the winding 12 in the module 48 by the closed switch 112 representing the high limit hundreds digit "8" opens the contacts 18 in the module 48 so that an output or borrow signal cannot be supplied to the relays 92 and 96. Thus, no overvalue indication is provided.

With regard to the low limit checking operation, only the winding 12 in the module 71 is operated, and the contacts 16 and 18 in this module are operated to open he contacts 18 and to close the contacts 16. The opening of the contacts 18 in the module 71 prevents the transmission of a borrow signal resulting from the comparison of less significant digits in the circuits 80 and 90. However, the closure of the contacts 16 does not result in the transmission of a positive signal representing a borrow to the output terminal of the module 71 because the terminal 24 of the module 71 is connected to an open circuit at the switch 120. The winding 14 in the module 72 is energized by the closed switch 118 representing the binary bit "2" in the hundreds digit of the low limit so that the contacts 16 in this module are closed. The closure of the contacts 16 in this module 72 connects the positive potential provided by the closed switch 118 to the normally closed contacts 18 in the module 74. In this module, both of the windings 12 and 14 are energized by the closed switches 128 and 116, respectively, representing the presence of the binary bit "4" in the binary coded designation of both the unknown hundreds digit "5" and the known low limit hundreds digit "6." This means that the net field produced by the bifilar winding in the module 74 has a negligible value, and the contacts 16 therein remain open and the contacts 18 therein remain closed. Thus, the closed contacts in the module 74 forward the positive potential provided by the module 72 to the normally closed contacts 18 in the module 78. Neither of the windings 12 and 14 in the module 78 is energized. Thus, the contacts 18 in the module 78 remain closed, and the positive potential provided by the closed switch 118 is applied directly to the winding of the relay 98 and through the diode 100 to the winding of the relay 96. This operates the relay 96 to close the contacts 96A and illuminate the lamp 142 as an indication of an alarm condition. The operation of the relay 98 closes a pair of normally open contacts 98A to illuminate a lamp 144 and provide a visible indication of the low limit violation.

Although the digital comparator 30 is shown in an illustrative example in which an unknown is compared against high and low limit values defining a desired range for the unknown value, it is obvious that the system 30 can be used in many other applications. As an example, a fixed value representing an address in storage or memory can be supplied by either the high limit signal source 102 or the low limit signal source 104, and the unknown value signal source 122 can supply a series of different decremented or incremented numbers representing successive addresses of scanned storage locations. Because of a lack of identity between the unknown value and the values presented by either the high limit signal source 102 or the low limit signal source 104, the relays 92, 96, and 98 will remain operated. However, when identity is established between the unknown value and the selected limit value, the corresponding output relays are released and can be used to provide a control indication representing identity. This signal can be used, for instance, to control the transfer of data from the accessed memory location. If the addresses supplied by the signal source 22 are in a random order, both of the sources 102 and 104 must provide the desired address.

Although the present invention has been described with respect to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. A comparator module for use with two signal sources comprising a differential winding means including a first winding and a second winding each having a winding input terminal to be coupled to one of the signal sources, the first and second windings providing oppositely poled magnetic fields which are combined to produce a resultant magnetic field;

a pair of normally open first contacts and a pair of normally closed second contacts, the first and second contacts being operated under the control of the resultant magnetic field produced by the differential winding means;

comparator input and output terminals;

first circuit means connecting the second contacts in series between the comparator input and output terminals;

and second circuit means connecting the first contacts between one of the winding input terminals and the comparator output terminal.

2. The comparator module set forth in claim 1 including a diode connected in series in the second circuit means.

3. A comparator module for use with two input signal sources comprising first and second windings providing oppositely poled magnetic fields of generally equal value which are combined to provide a resultant field, the first and second windings having winding input terminals to be individually coupled to the input signal sources, first and second magnetic contacts operated between open and closed circuit conditions under the control of the resultant field developed by the windings, biasing means for applying a magnetic bias to the first magnetic contacts to hold the first magnetic contacts in a normally closed condition, the polarity of the field provided by the biasing means being the same as the polarity of the field of the second winding, the second magnetic contacts being in a normally open condition, first circuit means connecting the first contacts between a comparator input terminal and a comparator output terminal, and second circuit means coupling the second contacts between the input terminal for the second winding and the comparator output terminal.

4. A digital comparator circuit for comparing plural digit entries comprising a plurality of individual comparator stages each representing a single digit and each including a pair of differential windings producing oppositely poled fields, a pair of normally closed first contacts opened by the energization of only one of said pair of differential windings, and a pair of normally open second contacts closed by the energization of either but not both of the pair of differential windings, each of the pair of differential windings having an individual input terminal;

an indicating means for indicating equality or lack of equality between digits;

first circuit means connecting the normally closed first contacts in a series with the indicating means with the first contacts in the stage corresponding to the most significant digit connected closest to the indicating means in the series connection and with the remaining first contacts disposed progressively more remote from the indicating means in the series connection in descending order of significance;

second circuit means connecting each of the second contacts to the series connection to the indicating means, said second circuit means connecting the second contacts in the stage for a given digit to the first contacts in the stage for the next most significant digit in the entry;

signal sources providing signals representing the values of two digital entries to be compared;

and means connecting the signal sources to the input terminals of the differential windings and to the second contacts of the stages, one input terminal in each stage being supplied with a signal representing one of the digits in one of the entries and the other input terminal in each stage being supplied with a signal representing a digit of the same significance in the other of the two entries to be compared.

5. A digital comparator circuit as set forth in claim 4 including permanent magnet biasing means for holding the first contacts normally closed, the permanent magnet biasing means having a polarity the same as the polarity of the field produced by one of the pair of differential windings.

6. A digital comparator circuit as set forth in claim 4 in which a diode is connected in series with each of the second contacts in each of the stages of the comparator.

References Cited

UNITED STATES PATENTS

| | | | |
|---|---|---|---|
| 2,984,821 | 5/1961 | Seigle | 340—149 |
| 3,289,159 | 11/1966 | Woodward | 340—146.2 |
| 2,539,043 | 1/1951 | Verneaux | 235—61 |
| 3,105,155 | 9/1963 | Barber | 307—88 |

OTHER REFERENCES

P. E. Locke, Digital Comparison, August 1961, vol. 4, No. 3, pp. 34–35, IBM Technical Disclosure Bulletin.

MALCOLM A. MORRISON, Primary Examiner

DAVID H. MALZAHN, Assistant Examiner